UNITED STATES PATENT OFFICE.

EAYRE O. BARTLETT, OF JOPLIN, MISSOURI.

METHOD OF MAKING SUBLIMED-LEAD PIGMENTS FROM LEAD-FUMES.

SPECIFICATION forming part of Letters Patent No. 515,042, dated February 20, 1894.

Application filed April 12, 1893. Serial No. 470,078. (No specimens.)

*To all whom it may concern:*

Be it known that I, EAYRE O. BARTLETT, of Joplin, county of Jasper, State of Missouri, have invented a certain new and useful Improved Method of Making Sublimed-Lead Pigments from Lead-Fumes, of which the following is a true and exact description.

My invention relates to the manufacture of a white pigment from the waste or other fumes driven off in various treatments of lead ores, my object being to obtain an increased production of pigment and also to improve the quality thereof.

The fumes to which my invention relates are such as are generally known as waste lead fumes although they are largely produced in furnaces especially adapted for their manufacture. These fumes are carried through proper cooling flues and finally separated from the furnace gases by screens; the separated fume being in an exceedingly finely divided condition and generally of a dark blue color due to the presence of unconsumed particles of carbon and also to the presence in large quantity of lead sulphide—the fume consisting, in addition to these constituents, of lead sulphate, lead oxide and more or less zinc principally in the form of oxide. This dark colored fume, which I will hereinafter call "blue fume," has heretofore been treated in various ways to convert it into a white pigment essentially consisting of a sulphate of lead. In some cases it has been subjected to great heat after leaving the furnace in which it is generated and before it is caught in screens with the view of burning up the carbon and oxidizing the lead sulphide to sulphate. It has also been attempted to whiten the fume by blowing it with admixture of air into intensely heated regenerative or other furnaces, or by throwing it on the top of a bright anthracite or coke fire, a large quantity of the fume treated in this way, while of a white color, is of a gritty consistency and not well adapted for the manufacture of paint. The most successful method heretofore employed has been that in which blue fume is first cindered together by igniting it, the fume having sufficient combustible constituents to burn slowly without extraneous fuel, and then charging the cindered blue fume into low cupola furnaces charged also of course with carbon and with other ores or material to form a proper slag; the result of this treatment being the production of metallic lead which is drawn off in the usual way and of a white lead fume which is collected by screens for use as a pigment. By this process however only about one-third of the lead in the blue fume is saved as a pigment, the balance being smelted. But on the other hand substantially all of the zinc contained in the blue fume is driven off with the pigment, the resulting mixture containing proportionately three times as much zinc as the blue fume. Now I have discovered that by mixing the blue fume with carbonaceous fuel and treating it in thin layers upon the hearth of a properly constructed furnace and under the action of a low blast that the fume is gradually smelted and the metallic lead thus produced recombined with sulphur and oxygen in the forms of fumes of lead oxide and lead sulphate, substantially the whole lead contents of the blue fume being thus re-sublimed and brought to proper condition for use as a pigment; the re-sublimed fume being free from grittiness and containing no greater proportion of zinc than was contained in the blue fume.

In carrying my process into effect I mix the blue fume, preferably in the finely divided condition in which it comes from the screens, with carbonaceous fuel preferably in the form of finely divided anthracite. I then charge this mixture in thin layers upon a hearth of a compound reducing and oxidizing furnace, preferably of the form of what is known as a Wetherill furnace. I ignite the mixture and subject it to the action of a low blast to effect the reduction, recombination and sublimation of the lead, finally separating the lead fume from the furnace gases by screens. For the proper action of my process it is important that the blue fume should be in a finely divided state and thoroughly mixed with the fuel so that the small particles of metallic lead will not tend to agglomerate and run down upon the hearth of the furnace instead of being recombined and driven off as fume. For this reason I prefer to use the blue fume without first burning and cindering it although the cindered product could be used by crushing or grinding it before mixing it with the fuel.

As in other processes of making a white pigment of the sublimed lead, the fume may be subjected, after it leaves the furnace and before it is separated from the gases by the screens, to the purifying action of hot flues or other devices.

I am aware that in the patent to Lewis, No. 346,114, of July 27, 1886, a suggestion is made to the effect that the blue fume together with roasted ores should be treated in a Wetherill furnace; but in such a treatment the fine particles of lead reduced from the fume would agglomerate with lead from the ore and reach the hearth of the furnace before they were re-combined and sublimed to the desired extent; by treating the fume alone and with a low blast I have succeeded in obtaining a much higher percentage of fume and lower percentage of lead than is possible by the said suggested treatment of Lewis.

Having now described my invention, what I claim as new, and desire to secure by Letters Patent, is—

The method of making a sublimed lead pigment from lead fume which consists in mixing said fume only with carbon, charging the mixture in thin layers on the hearth of a compound reducing and oxidizing furnace, igniting and subjecting it to the action of a low blast to effect the reduction of the lead compounds, and their recombination, and sublimation as fume, and finally separating the fume from furnace gases by screening.

EAYRE O. BARTLETT.

Witnesses:
ALF. H. FABER,
D. STEWART.